(12) United States Patent
Petrie

(10) Patent No.: US 10,369,935 B1
(45) Date of Patent: Aug. 6, 2019

(54) PORTABLE WORKSTATION ASSEMBLY

(71) Applicant: Jeremy Petrie, Vermillion (CA)

(72) Inventor: Jeremy Petrie, Vermillion (CA)

(*) Notice: Subject to any disclaimer, the term of this patent is extended or adjusted under 35 U.S.C. 154(b) by 0 days.

(21) Appl. No.: 15/908,464

(22) Filed: Feb. 28, 2018

(51) Int. Cl.
*A47B 23/00* (2006.01)
*A47B 37/00* (2006.01)
*B60R 11/02* (2006.01)
*B60N 3/00* (2006.01)
*B60R 11/00* (2006.01)

(52) U.S. Cl.
CPC .......... *B60R 11/0252* (2013.01); *B60N 3/005* (2013.01); *B60R 2011/001* (2013.01)

(58) Field of Classification Search
CPC .. B60R 11/252; B60R 2011/001; B60N 3/005
USPC .............................................. 108/44, 45, 46
See application file for complete search history.

(56) References Cited

U.S. PATENT DOCUMENTS

| | | | | |
|---|---|---|---|---|
| 2,244,861 A * | 6/1941 | Walker | ............. | B43L 3/008 108/152 |
| 2,886,381 A * | 5/1959 | Sale | ............. | B61F 17/06 384/172 |
| 2,898,170 A * | 8/1959 | Antonius | ............. | A47B 5/02 108/152 |
| 4,890,559 A * | 1/1990 | Martin | ............. | B60N 3/005 108/44 |
| 5,060,581 A | 10/1991 | Malinski | | |
| 5,487,521 A * | 1/1996 | Callahan | ............. | B60N 3/005 108/44 |
| 5,749,305 A | 5/1998 | Jacovelli | | |
| 6,036,158 A | 3/2000 | Raasch | | |
| 6,148,738 A * | 11/2000 | Richter | ............. | B60N 3/005 108/44 |
| 6,240,857 B1 * | 6/2001 | Elizer | ............. | A47B 97/04 108/147.17 |
| 6,279,800 B1 | 8/2001 | Lee | | |
| 6,408,769 B1 * | 6/2002 | Lewis | ............. | B60N 3/005 108/44 |
| 6,494,148 B1 | 12/2002 | Mullaney | | |
| 7,093,545 B2 * | 8/2006 | Twyford | ............. | B60N 3/005 108/44 |
| 8,079,312 B2 | 12/2011 | Long | | |
| D725,013 S | 3/2015 | Salinas | | |
| 2012/0018472 A1 * | 1/2012 | Totani | ............. | B60R 11/0252 224/276 |
| 2012/0085269 A1 * | 4/2012 | Ohide | ............. | A47B 31/06 108/44 |
| 2016/0039525 A1 * | 2/2016 | Pajic | ............. | B64D 11/0638 108/44 |
| 2016/0059795 A1 * | 3/2016 | Rook | ............. | B60N 3/004 108/25 |

* cited by examiner

*Primary Examiner* — Daniel J Troy
*Assistant Examiner* — Timothy M Ayres

(57) ABSTRACT

A portable workstation assembly for supporting a laptop computer in a vehicle includes a member is extended through a steering wheel in a vehicle having the member abutting a steering column in the vehicle. The member rests on an outer ring of the steering wheel when the member is extended through the steering wheel. A panel is coupled to the member such that the panel is oriented on a plane that is angled downwardly with respect to a horizontal plane when the member is extended through the steering wheel. In this way the panel is positioned to support a laptop computer or the like at an ergonomically efficient position for a driver of the vehicle.

7 Claims, 5 Drawing Sheets

PORTABLE WORKSTATION ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to workstation devices and more particularly pertains to a new workstation device for supporting a laptop computer in a vehicle.

BRIEF SUMMARY OF THE INVENTION

An embodiment of the disclosure meets the needs presented above by generally comprising a member is extended through a steering wheel in a vehicle having the member abutting a steering column in the vehicle. The member rests on an outer ring of the steering wheel when the member is extended through the steering wheel. A panel is coupled to the member such that the panel is oriented on a plane that is angled downwardly with respect to a horizontal plane when the member is extended through the steering wheel. In this way the panel is positioned to support a laptop computer or the like at an ergonomically efficient position for a driver of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
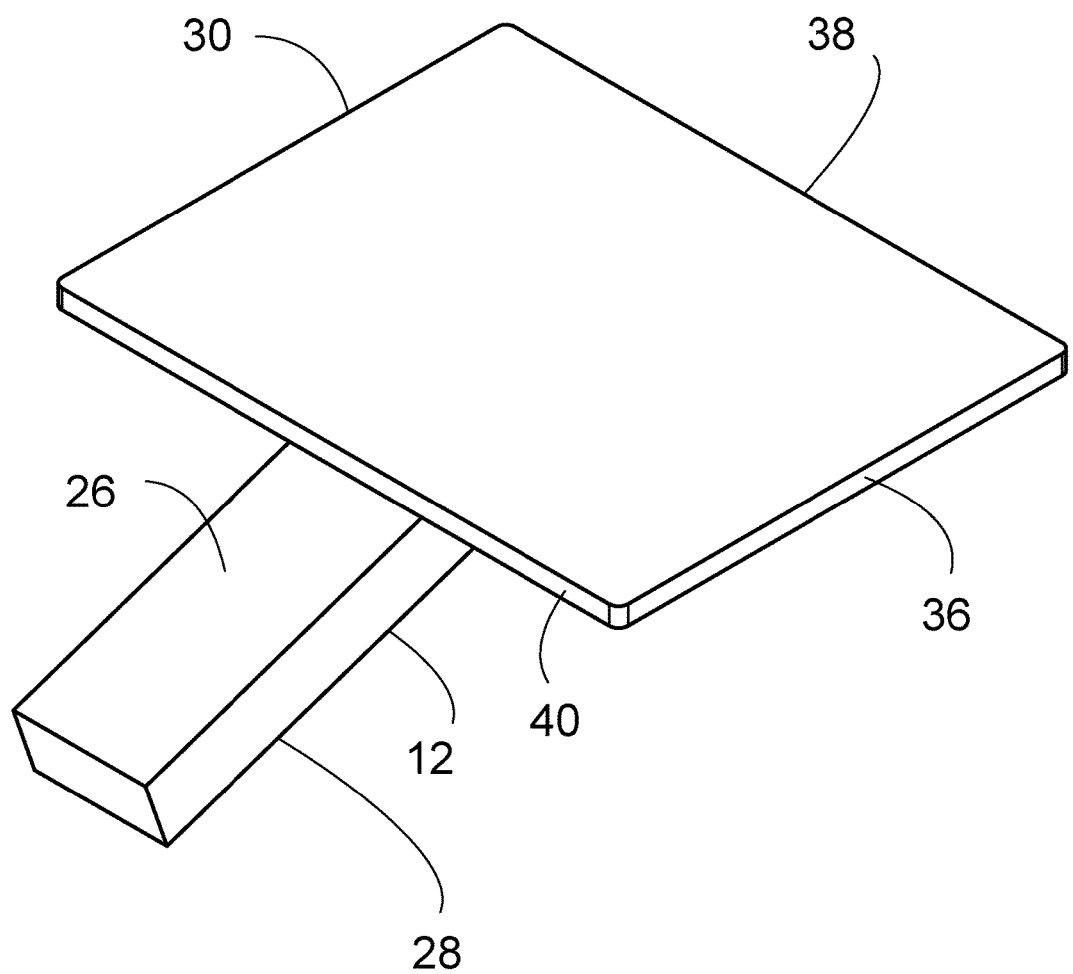
FIG. 1 is a top perspective view of a portable workstation assembly according to an embodiment of the disclosure.
Figure 2:
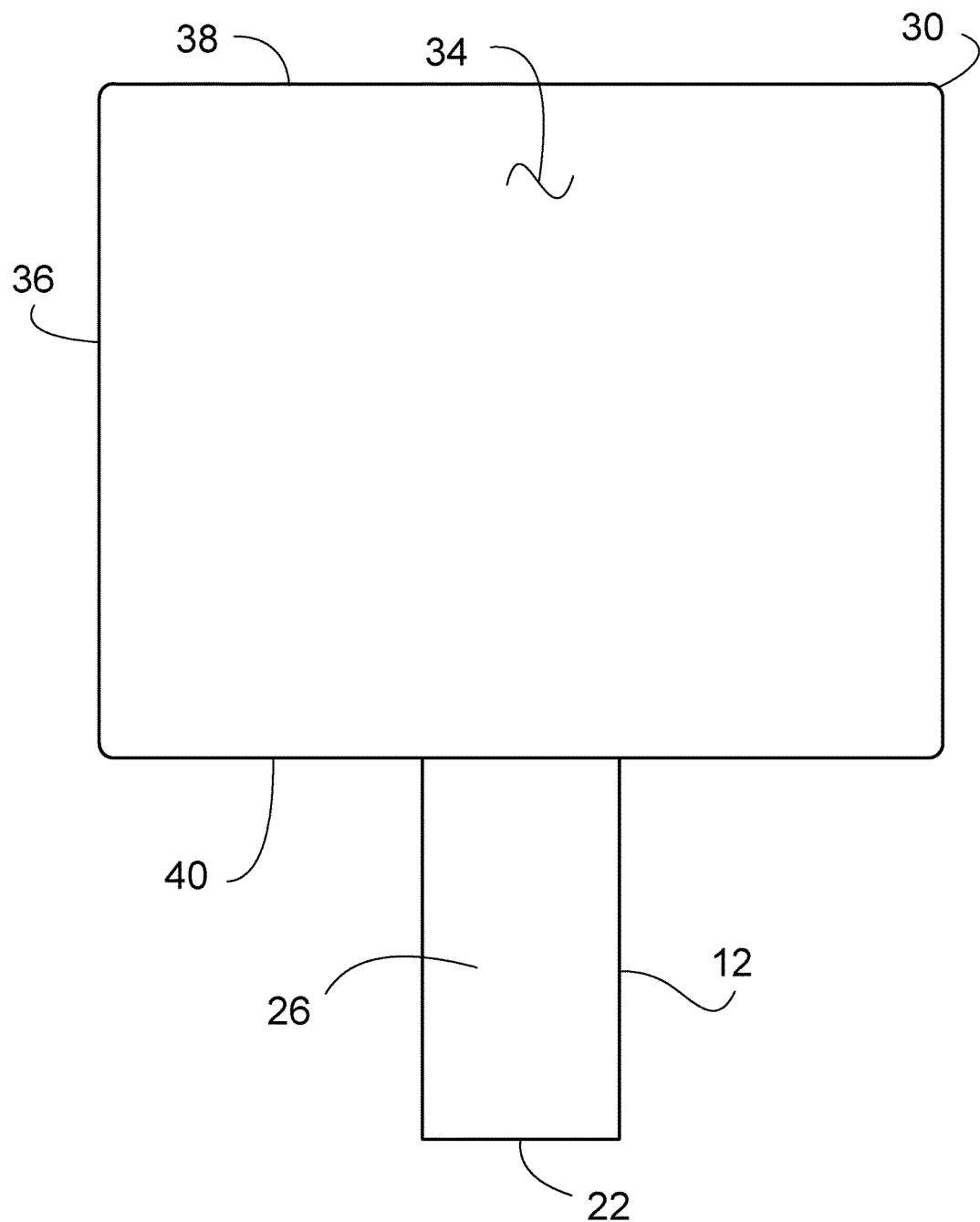
FIG. 2 is a top view of an embodiment of the disclosure.
Figure 3:
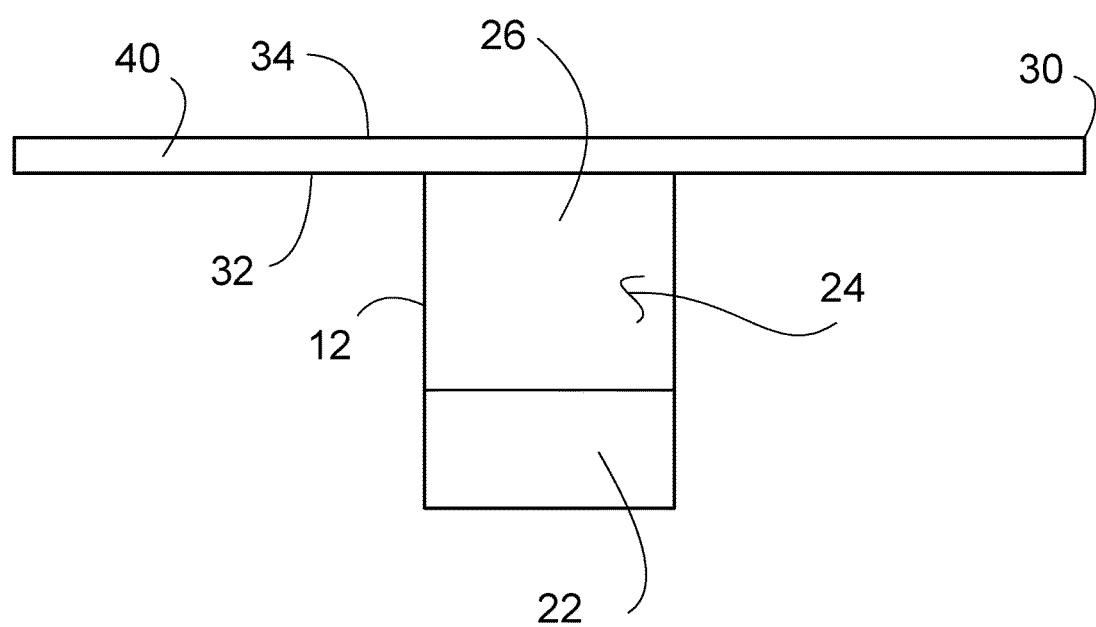
FIG. 3 is a back view of an embodiment of the disclosure.
Figure 4:
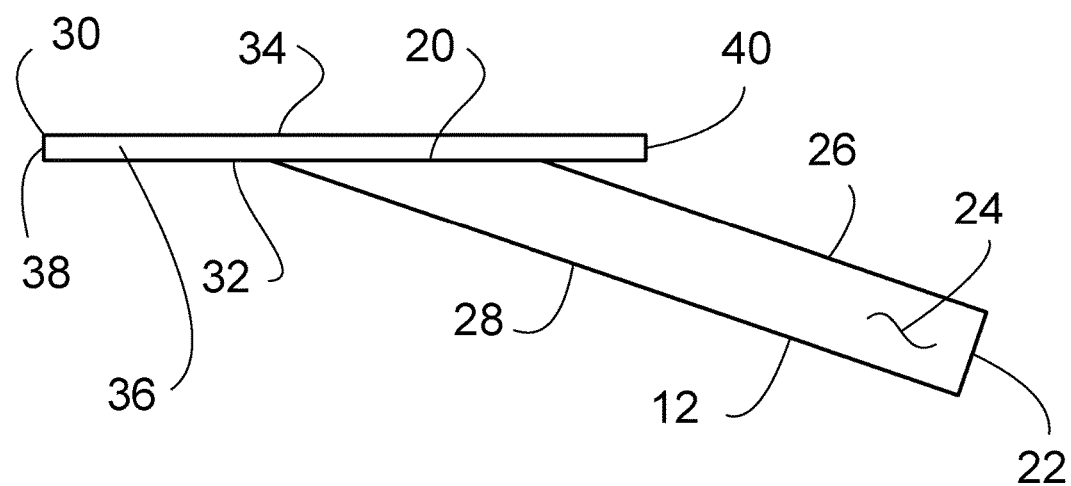
FIG. 4 is a left side view of an embodiment of the disclosure.
Figure 5:
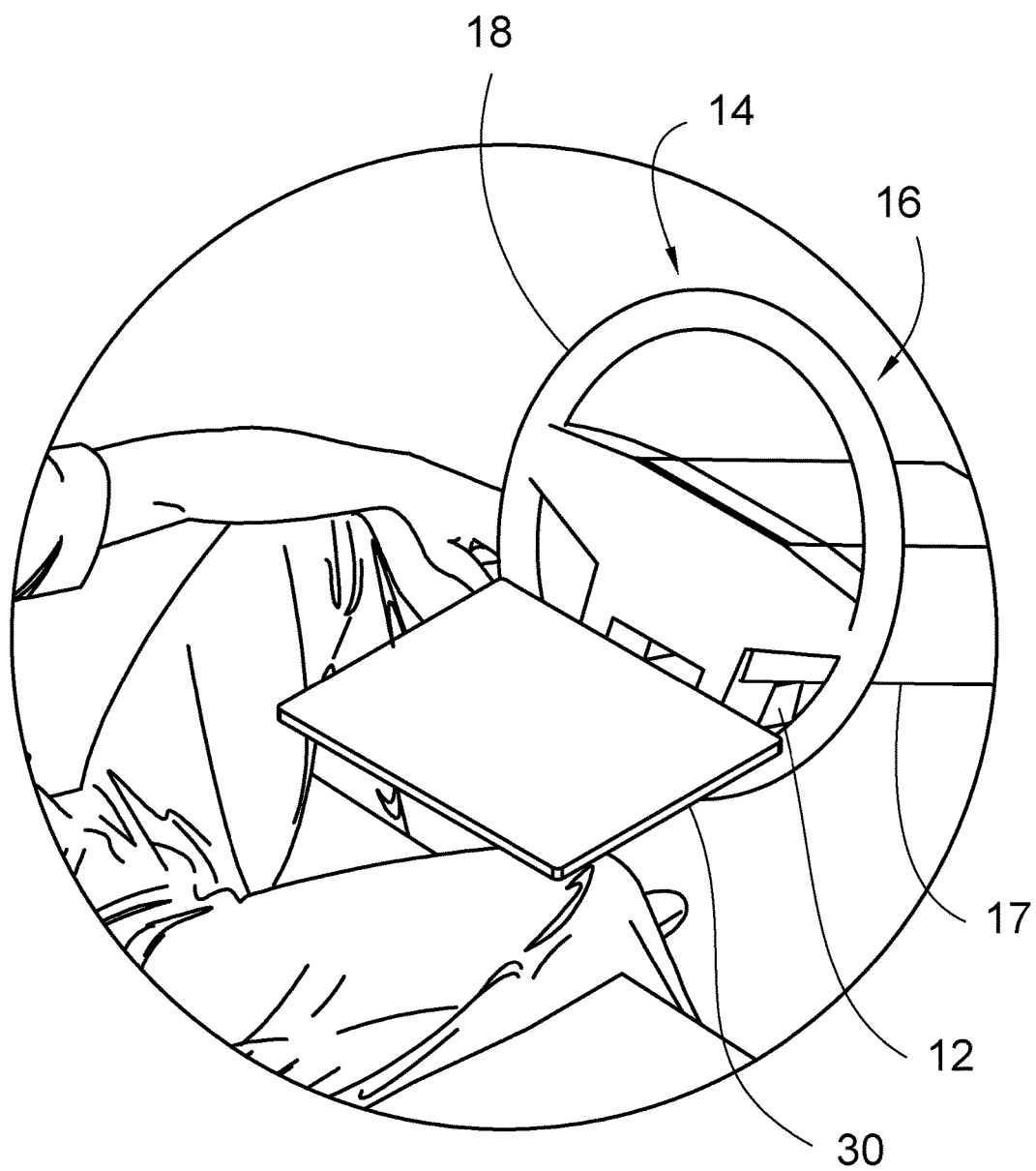
FIG. 5 is a perspective in-use view of an embodiment of the disclosure.

With reference now to the drawings, and in particular to FIGS. 1 through 5 thereof, a new workstation device embodying the principles and concepts of an embodiment of the disclosure and generally designated by the reference numeral 10 will be described.

As best illustrated in FIGS. 1 through 5, the portable workstation assembly 10 generally comprises a member 12 that is extended through a steering wheel 14 in a vehicle 16 having the member 12 engaging a steering column 17 in the vehicle 16. The vehicle 16 may be a passenger vehicle, a cargo vehicle, and any other motorized vehicle that has a steering wheel 14. The member 12 rests on an outer ring 18 of the steering wheel 14 when the member 12 is extended through the steering wheel 14. The member 12 has a first end 20, a second end 22 and an outer surface 24 extending therebetween, and the outer surface 24 has a top side 26 and a bottom side 28.

The first end 20 is cut at an acute angle between the top side 26 and the bottom side 28. Moreover, a surface defined by the first end 20 has a length of approximately 13.5 cm. The top side 26 has a length of approximately 16.0 cm and the bottom side 28 has a length of approximately 29.0 cm. The top side 26 abuts a bottom of the steering column 17 and the bottom side 28 abuts the outer ring 18 of the steering wheel 14. Additionally, the first end 20 is directed toward a driver of the vehicle 16 when the member 12 is positioned in the steering wheel 14.

A panel 30 is provided and the panel 30 is coupled to the member 12. The panel 30 is oriented on a plane being angled downwardly with respect to a horizontal plane when the member 12 is extended through the steering wheel 14. Thus, the panel 30 is positioned to support a laptop computer or the like. The panel 30 has a first surface 32, a second surface 34 and a peripheral edge 36 extending therebetween, and the peripheral edge 36 has a front side 38 and a back side 40. The first end 20 of the member 12 is attached to the first surface 32 of the panel 30 having the member 12 angling downwardly from the first surface 32 and extending away from the back side 40.

The member 12 is centrally positioned along the back side 40. Additionally, an intersection between the top side 26 and the first end 20 of the member 12 is spaced from the back side 40 of the peripheral edge 36 of the panel 30 a distance of approximately 2.0 cm. Thus, the back side 40 abuts the outer ring 18 of the steering wheel 14 when the member 12 is extended through the steering wheel 14. In this way the panel 30 and the member 12 are securely retained on the steering wheel 14 for supporting weight. The second surface 34 is oriented on a plane corresponding to the acute angle defined by the first end 20 of the member 12. In this way the second surface 34 supports the laptop computer at an ergonomically efficient angle for the driver.

In use, the panel 30 is gripped and the member 12 is extended through the opening in the steering wheel 14 thereby facilitating the member 12 to abut the bottom of the steering column 17 and rest on the outer ring 18 of the steering wheel 14. The panel 30 is urged toward the steering wheel 14 until the back side 40 of the panel 30 abuts the steering wheel 14. In this way the panel 30 is securely retained on the steering wheel 14 for supporting weight without tilting. The laptop computer, or any other object, is positioned on the second surface 34 of the panel 30 for use by the driver. In this way the laptop computer is positioned at an ergonomically efficient height and an ergonomically efficient angle with respect to the driver. Moreover, the driver is not required to twist at the waist or bend in any way to use the laptop computer while the driver is seated in the vehicle 16. In this way the panel 30 and member 12 reduce the likelihood of back injuries resulting from twisting and bending to use a laptop computer in a vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable workstation assembly in combination with a vehicle for supporting a laptop computer, said combination comprising:
    the vehicle having a steering wheel supported by a steering column;
    a member being extended through said steering wheel in said vehicle having said member abutting said steering column in the vehicle, said member resting on an outer ring of the steering wheel when said member is extended through the steering wheel;
    a panel being coupled to said member such that said panel is oriented on a plane being angled downwardly with respect to a horizontal plane when said member is extended through the steering wheel wherein said panel is configured to support a laptop computer or the like at an ergonomically efficient position for a driver of the vehicle; and
    said member has a first end, a second end and an outer surface extending therebetween, said outer surface having a top side and a bottom side, said first end being cut at an acute angle between said top side and said bottom side such that a surface defined by said first end has a length of approximately 13.5 cm.

2. The assembly according to claim 1, wherein said top side has a length of approximately 16.0 cm.

3. The assembly according to claim 2, wherein said bottom side has a length of approximately 29.0 cm, said top side abutting the steering column, said bottom side abutting the outer ring of the steering wheel wherein said first end is configured to be directed toward a driver of the vehicle.

4. The assembly according to claim 1, wherein said panel has a first surface, a second surface and a peripheral edge extending therebetween, said peripheral edge having a front side and a back side, said first end of said member being attached to said first surface of said panel having said member angling downwardly from said first surface and extending away from said back side, said member being centrally positioned along said back side.

5. The assembly according to claim 4, wherein an intersection between said top side and said first end of said member is spaced from said back side of said peripheral edge of said panel a distance of approximately 2.0 cm such that said back side abuts the outer ring of the steering wheel when said member is extended through the steering wheel.

6. The assembly according to claim 5, wherein said second surface is oriented on a plane corresponding to said acute angle defined by said first end of said member wherein said second surface is configured to support the laptop computer at an ergonomically efficient angle for the driver.

7. A portable workstation assembly in combination with a vehicle for supporting a laptop computer, said combination comprising:
    the vehicle having a steering wheel supported by a steering column;
    a member being extended through said steering wheel in said vehicle having said member abutting said steering column in the vehicle, said member resting on an outer ring of the steering wheel when said member is extended through the steering wheel, said member having a first end, a second end and an outer surface extending therebetween, said outer surface having a top side and a bottom side, said first end being cut at an acute angle between said top side and said bottom side such that a surface defined by said first end has a length of approximately 13.5 cm, said top side having a length of approximately 16.0 cm, said bottom side having a length of approximately 29.0 cm, said top side abutting the steering column, said bottom side abutting the outer ring of the steering wheel wherein said first end is configured to be directed toward a driver of the vehicle; and
    a panel being coupled to said member such that said panel is oriented on a plane being angled downwardly with respect to a horizontal plane when said member is extended through the steering wheel wherein said panel is configured to support a laptop computer, said panel having a first surface, a second surface and a peripheral edge extending therebetween, said peripheral edge having a front side and a back side, said first end of said member being attached to said first surface of said panel having said member angling downwardly from said first surface and extending away from said back side, said member being centrally positioned along said back side, an intersection between said top side and said first end of said member being spaced from said back side of said peripheral edge of said panel a distance of approximately 2.0 cm such that said back side abuts the outer ring of the steering wheel when said member is extended through the steering wheel, said second surface being oriented on a plane corresponding to said acute angle defined by said first end of said member wherein said second surface is configured to support the laptop computer at an ergonomically efficient angle for the driver.

\* \* \* \* \*